(12) United States Patent
Simbal

(10) Patent No.: US 7,403,680 B2
(45) Date of Patent: Jul. 22, 2008

(54) REFLECTIVE LIGHT COUPLER

(75) Inventor: John J. Simbal, Lakeway, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 212 days.

(21) Appl. No.: 10/726,244

(22) Filed: Dec. 2, 2003

(65) Prior Publication Data

US 2005/0117366 A1    Jun. 2, 2005

(51) Int. Cl.
*G02B 6/26* (2006.01)
(52) U.S. Cl. .............................. 385/31; 385/88; 257/98
(58) Field of Classification Search .................. None
See application file for complete search history.

(56) References Cited

U.S. PATENT DOCUMENTS

| | | | |
|---|---|---|---|
| 3,825,335 A | | 7/1974 | Reynolds |
| 3,902,059 A | * | 8/1975 | McNamara, Jr. ............ 362/349 |
| 4,254,453 A | | 3/1981 | Mouyard et al. |
| 4,386,824 A | * | 6/1983 | Draper ........................ 359/868 |
| 4,544,259 A | | 10/1985 | Kanaoka et al. |
| 4,755,918 A | * | 7/1988 | Pristash et al. .............. 362/301 |
| 4,897,771 A | * | 1/1990 | Parker ........................ 362/298 |
| 4,914,731 A | | 4/1990 | Chen |
| 4,964,025 A | * | 10/1990 | Smith ........................ 362/346 |
| 5,146,248 A | | 9/1992 | Duwaer |
| 5,227,008 A | | 7/1993 | Klun et al. |
| 5,293,437 A | | 3/1994 | Nixon |
| 5,299,222 A | | 3/1994 | Shannon et al. |
| 5,301,090 A | | 4/1994 | Hed |
| 5,302,999 A | | 4/1994 | Oshida et al. |
| 5,317,484 A | * | 5/1994 | Davenport et al. .......... 362/551 |
| 5,420,768 A | | 5/1995 | Kennedy |
| 5,534,718 A | * | 7/1996 | Chang ........................ 257/98 |

(Continued)

FOREIGN PATENT DOCUMENTS

DE    199 23 187 A1    11/2000

(Continued)

OTHER PUBLICATIONS

Hsu, J.T. et al., "Design of multi-chips LED module for lighting application", *Solid State Lighting II, Proceedings of SPIE* (2002), vol. 4776, pp. 26-33.

(Continued)

*Primary Examiner*—Sung Pak
*Assistant Examiner*—Mike Stahl
(74) *Attorney, Agent, or Firm*—Jay R. Pralle

(57) ABSTRACT

An illumination system has individual light emitting diodes (LEDs) that are optically coupled via reflective couplers to respective optical fibers. The respective optical fibers may then be bundled. The shape of the reflective coupler may be selected to increase the coupling efficiency between the LED and its optical fiber. The reflective coupler may be formed as an aperture through a sheet, having a first shape at the input side and a second shape, different form the first shape, at the second side. The reflective coupler may be formed as an aperture through a body, where at least a first portion of the interior surface of the aperture conforms to a two-dimensional (2-D) surface and at least a second portion of the interior surface conforms to a three-dimensional (3-D) surface.

32 Claims, 12 Drawing Sheets

U.S. PATENT DOCUMENTS

| | | | |
|---|---|---|---|
| 5,567,032 | A | 10/1996 | Heizmann |
| 5,574,817 | A | 11/1996 | Henson et al. |
| 5,580,471 | A | 12/1996 | Fukumoto et al. |
| 5,611,017 | A | 3/1997 | Lee et al. |
| 5,629,996 | A * | 5/1997 | Rizkin et al. ............... 385/31 |
| 5,634,711 | A | 6/1997 | Kennedy et al. |
| 5,661,839 | A | 8/1997 | Whitehead |
| 5,693,043 | A | 12/1997 | Kittrell et al. |
| 5,709,463 | A * | 1/1998 | Igram ..................... 362/268 |
| 5,713,654 | A | 2/1998 | Scifres |
| 5,727,108 | A * | 3/1998 | Hed ....................... 385/133 |
| 5,748,816 | A * | 5/1998 | Jaksic et al. ............... 385/39 |
| 5,808,794 | A | 9/1998 | Weber et al. |
| 5,810,469 | A * | 9/1998 | Weinreich ................ 362/298 |
| 5,816,694 | A * | 10/1998 | Ideker et al. .............. 362/348 |
| 5,882,774 | A | 3/1999 | Jonza et al. |
| 5,886,313 | A | 3/1999 | Krause et al. |
| 5,909,037 | A | 6/1999 | Rajkomar et al. |
| 5,959,316 | A | 9/1999 | Lowery |
| 5,967,653 | A | 10/1999 | Miller et al. |
| 6,002,466 | A | 12/1999 | Brauch et al. |
| 6,045,240 | A | 4/2000 | Hochstein |
| 6,075,595 | A | 6/2000 | Malinen |
| 6,104,446 | A * | 8/2000 | Blankenbecler et al. ........ 349/5 |
| 6,155,699 | A | 12/2000 | Miller et al. |
| 6,200,134 | B1 | 3/2001 | Kovac et al. |
| 6,224,216 | B1 | 5/2001 | Parker et al. |
| 6,236,382 | B1 | 5/2001 | Kawakami et al. |
| 6,290,382 | B1 | 9/2001 | Bourn et al. |
| 6,318,886 | B1 | 11/2001 | Stopa et al. |
| 6,340,824 | B1 | 1/2002 | Komoto et al. |
| 6,343,872 | B1 * | 2/2002 | Cerone et al. ............... 362/297 |
| 6,350,041 | B1 | 2/2002 | Tarsa et al. |
| 6,395,564 | B1 | 5/2002 | Huang |
| 6,402,347 | B1 | 6/2002 | Maas et al. |
| 6,406,172 | B1 | 6/2002 | Harbers et al. |
| 6,414,801 | B1 | 7/2002 | Roller |
| 6,417,917 | B1 | 7/2002 | Jung et al. |
| 6,434,327 | B1 | 8/2002 | Gronet et al. |
| 6,521,915 | B2 | 2/2003 | Odaki et al. |
| 6,527,411 | B1 | 3/2003 | Sayers |
| 6,556,734 | B1 | 4/2003 | Bischel et al. |
| 6,560,038 | B1 | 5/2003 | Parkyn, Jr. et al. |
| 6,587,573 | B1 | 7/2003 | Stam et al. |
| 6,603,258 | B1 | 8/2003 | Mueller-Mach et al. |
| 6,692,250 | B1 | 2/2004 | Decaudin et al. |
| 6,733,711 | B2 | 5/2004 | Durocher et al. |
| 6,809,342 | B2 * | 10/2004 | Harada ..................... 257/79 |
| 6,821,143 | B2 | 11/2004 | Gasquet et al. |
| 6,874,910 | B2 | 4/2005 | Sugimoto et al. |
| 6,901,090 | B1 | 5/2005 | Ohtsuki |
| 6,921,920 | B2 | 7/2005 | Kazakevich |
| 6,943,380 | B2 | 9/2005 | Ota et al. |
| 6,949,772 | B2 | 9/2005 | Shimizu et al. |
| 6,954,565 | B2 * | 10/2005 | Lindt ....................... 385/31 |
| 6,960,035 | B2 | 11/2005 | Okazaki et al. |
| 7,029,277 | B2 | 4/2006 | Gofman et al. |
| 2001/0001207 | A1 | 5/2001 | Shimizu et al. |
| 2001/0009510 | A1 | 7/2001 | Lodhie |
| 2001/0010449 | A1 | 8/2001 | Chiu et al. |
| 2001/0033712 | A1 | 10/2001 | Cox et al. |
| 2002/0018199 | A1 | 2/2002 | Blumenfeld et al. |
| 2002/0024055 | A1 | 2/2002 | Uemura et al. |
| 2002/0113244 | A1 | 8/2002 | Barnett et al. |
| 2002/0126479 | A1 | 9/2002 | Zhai et al. |
| 2002/0171047 | A1 | 11/2002 | Chan et al. |
| 2002/0176251 | A1 | 11/2002 | Plank et al. |
| 2003/0001488 | A1 | 1/2003 | Sundahl |
| 2003/0042493 | A1 | 3/2003 | Kazakevich |
| 2003/0052594 | A1 | 3/2003 | Matsui et al. |
| 2003/0057421 | A1 | 3/2003 | Tzer-Perng Chen |
| 2003/0068113 | A1 | 4/2003 | Janz et al. |
| 2003/0091277 | A1 | 5/2003 | Mei |
| 2003/0117691 | A1 | 6/2003 | Bi et al. |
| 2003/0142500 | A1 | 7/2003 | Bachl et al. |
| 2003/0173575 | A1 * | 9/2003 | Eisert et al. ................... 257/95 |
| 2003/0175000 | A1 | 9/2003 | Caracci et al. |
| 2003/0178627 | A1 | 9/2003 | Marchl et al. |
| 2003/0185508 | A1 | 10/2003 | Fukuyama et al. |
| 2003/0189829 | A1 | 10/2003 | Shimizu et al. |
| 2003/0214571 | A1 | 11/2003 | Ishikawa et al. |
| 2003/0233138 | A1 | 12/2003 | Ishikawa et al. |
| 2003/0235800 | A1 | 12/2003 | Qadar |
| 2004/0008952 | A1 | 1/2004 | Kragl |
| 2004/0106968 | A1 | 6/2004 | Yamada |
| 2004/0159900 | A1 | 8/2004 | Ouderkirk et al. |
| 2004/0164325 | A1 | 8/2004 | Siegel |
| 2004/0166249 | A1 | 8/2004 | Siegel |
| 2004/0190573 | A1 | 9/2004 | Kruschwitz et al. |
| 2004/0262053 | A1 | 12/2004 | Ludewig et al. |
| 2005/0177208 | A1 | 8/2005 | Irwin |
| 2006/0044531 | A1 * | 3/2006 | Potekev ..................... 353/122 |

FOREIGN PATENT DOCUMENTS

| | | |
|---|---|---|
| DE | 201 11 814 U1 | 12/2001 |
| DE | 10025563 A1 | 12/2001 |
| DE | 201 20 770 U1 | 5/2002 |
| DE | 101 10 835 A1 | 9/2002 |
| DE | 101 34 381 A1 | 1/2003 |
| DE | 101 62 404 A1 | 7/2003 |
| EP | 0 181 193 A | 5/1986 |
| EP | 0 249 934 A | 12/1987 |
| EP | 0303741 | 2/1989 |
| EP | 0338641 A1 | 10/1989 |
| EP | 0490 292 A | 6/1992 |
| EP | 0588040 A2 | 3/1994 |
| EP | 0 468 319 | 5/1996 |
| EP | 0889495 A1 | 1/1999 |
| EP | 1 067 332 A2 | 1/2001 |
| EP | 1 081 771 | 3/2001 |
| EP | 1108949 | 6/2001 |
| EP | 1 241 510 | 9/2002 |
| EP | 1 241 869 A | 9/2002 |
| EP | 1 260 196 A2 | 11/2002 |
| EP | 1 372 008 | 12/2003 |
| FR | 2662896 | 12/1991 |
| JP | 02-142695 | 5/1990 |
| JP | 02189803 | 7/1990 |
| JP | 07240536 A | 9/1995 |
| JP | 08008463 | 1/1996 |
| JP | 10256694 | 9/1998 |
| JP | 11284233 | 10/1999 |
| JP | 2002-065603 A | 3/2002 |
| WO | WO95/20811 | 8/1995 |
| WO | WO99/41785 | 8/1999 |
| WO | WO 01/20398 A | 3/2001 |
| WO | WO 01/59360 A1 | 8/2001 |
| WO | WO 02/054129 | 7/2002 |
| WO | WO 02/054129 A1 | 7/2002 |
| WO | WO 02/086972 A1 | 10/2002 |
| WO | WO 03/023857 A2 | 3/2003 |
| WO | WO 03/077013 | 9/2003 |
| WO | WO 03/096387 A2 | 11/2003 |
| WO | WO 2004/004017 A2 | 1/2004 |
| WO | WO 2004/081475 A2 | 9/2004 |
| WO | WO 2005/062382 A2 | 7/2005 |

OTHER PUBLICATIONS

U.S. Appl. No. 10/317,734, filed Dec. 2, 2002 having Title—Optical fiber or Waveguide Lens.

U.S. Appl. No. 60/430,230, filed Dec. 2, 2002 having Title—Illumination System Using a Plurality of Remote Light Sources.

U.S. Appl. No. 60/443,232, filed Jan. 27, 2003 having Title—Methods of Making LED-excited Phosphor-based Light Sources.

U.S. Appl. No. 60/443,235, filed Jan. 27, 2003 having Title—LED-excited Phosphor-based Light Sources with Front Illumination.

U.S. Appl. No. 60/443,274, filed Jan. 27, 2003 having Title—LED-excited Phosphor-based Light Sources.

U.S. Appl. No. 10/670,630, filed Sep. 25, 2003 having Title—Lensed Optical Fiber and Method for Making the Same.

U.S. Appl. No. 10/726,222, filed Dec. 2, 2003 having Title—Illumination System Using A Plurality Of Light Sources.

U.S. Appl. No. 10/726,997, filed Dec. 2, 2003 having Title—Phosphor Based Light Sources Having a Polymeric Long Pass Reflector.

U.S. Appl. No. 10/727,220, filed Dec. 2, 2003 having Title—Illumination Assembly.

U.S. Appl. No. 10/726,225, filed Dec. 2, 2003 having Title—Solid State Light Device.

U.S. Appl. No. 10/726,248, filed Dec. 2, 2003 having Title—Multiple LED Source and Method for Assembling Same.

U.S. Appl. No. 10/727,072, filed Dec. 2, 2003 having Title—Phosphor Based Light Sources Having a Non-Planar Long Pass Reflector.

U.S. Appl. No. 10/726,257, filed Dec. 2, 2003 having Title—LED Curing Apparatus and Method.

U.S. Appl. No. 10/727,023, filed Dec. 2, 2003 having Title—Methods of Making Phosphor Based Light Sources Having an Interference Reflector.

Žukauskas et al, *Introduction to Solid-State Lighting*, John Wiley & Sons, Inc., New York, 2002, pp. 166-167.

"Solid-State Laser/Fiber Optic Expose Machine," IBM Technical Disclosure Bulletin, IBM Corp. vol. 30, No. 10, New York, Mar. 1, 1988, 249-250.

\* cited by examiner

REFLECTIVE LIGHT COUPLER

RELATED PATENT APPLICATIONS

The following co-owned and concurrently filed U.S. patent applications are incorporated herein by reference: "ILLUMINATION SYSTEM USING A PLURALITY OF LIGHT SOURCES", having Ser. No. 10/726,222; "MULTIPLE LED SOURCE AND METHOD FOR ASSEMBLING SAME", Ser. No. 10/726,248; "SOLID STATE LIGHT DEVICE", having Ser. No. 10/726,225; "ILLUMINATION ASSEMBLY", having Ser. No. 10/727,220; "PHOSPHOR BASED LIGHT SOURCES HAVING A POLYMERIC LONG PASS REFLECTOR", having Ser. No. 10/726,997; and "PHOSPHOR BASED LIGHT SOURCES HAVING A NON-PLANAR LONG PASS REFLECTOR", having Ser. No. 10/727,072.

FIELD OF THE INVENTION

The invention relates to optical systems, and more particularly to couplers for coupling light from a broadly emitting light source to a target such as an optical fiber.

BACKGROUND

Illumination systems are used in a variety of applications. Home and industrial applications often require light to be made available. Similarly, aircraft, marine, and automotive applications often require high intensity light beams for illumination. Traditional lighting systems have used electrically powered filament or arc lamps, which sometimes include focusing lenses and/or reflective surfaces to collect the emitted light and direct it as a light beam to the intended target.

In certain applications, however, it may be advantageous to remove the light source from an environment where electrical contacts are undesirable, that is subject to physical shock or damage, or where space is limited. In response to such needs, illumination systems have been developed that use light guides to guide the light from the light source to a desired illumination point. One current approach is to use a single, bright source or a cluster of light sources to illuminate the input end of a light guide, such as a large core plastic fiber. In another approach, the single fiber may be replaced by a bundle of fibers. These methods are generally inefficient, with approximately 70% of the generated light being lost in some cases. In multiple fiber systems, some of the loss is attributable to the dark spaces between fibers. In a single light guide approach, a light guide having a large enough diameter to capture the amount of light needed for bright lighting applications becomes thick and, therefore, loses flexibility.

Some illumination systems use lasers as light sources, to take advantage of the coherent light output and high coupling efficiency to light guides. Laser sources, however, are expensive and typically produce light at a single wavelength, which is less useful where the requirement is for broadband illumination.

There is, therefore, a need for an illumination system that can efficiently deliver high intensity illumination, at reasonable cost, using a remote light source.

SUMMARY OF THE INVENTION

One particular approach to constructing a high intensity illumination system is to couple light from individual light emitting diodes (LEDs) to respective optical fibers. The respective optical fibers may then be bundled to form a remote illumination output. A reflective coupler between each LED and its respective optical fiber provides highly efficient optical coupling. The shape of the reflective coupler is important for maintaining a high coupling efficiency between the LED and its optical fiber.

One embodiment of the invention is directed to a reflecting coupler that comprises a body having an aperture extending therethrough from a first side to a second side. An interior surface of the aperture is reflective. A first portion of the interior reflective surface conforms to a two-dimensional (2-D) surface and a second portion of the interior reflective surface conforms to a three-dimensional (3-D) surface. The 2-D surface extending at least partially between the first and second sides of the body.

Another embodiment of the invention is directed to an optical system that comprises a first reflecting coupler disposed generally along a reflector axis. A first light source is disposed proximate the first side of the body so as to emit light into the aperture. A first optical fiber has an entrance face disposed proximate the second side of the body so as to receive light through the aperture from the first light source. The reflecting coupler is formed from a body having an aperture extending therethrough from a first side to a second side. An interior surface of the aperture is reflective. A first portion of the interior reflective surface conforms to a two-dimensional (2-D) surface and a second portion of the interior reflective surface conforms to a three-dimensional (3-D) surface. The 2-D surface extending at least partially between the first and second sides of the body.

Another embodiment of the invention is directed to a reflecting coupler that comprises a sheet of material having an aperture extending therethrough from a first surface of the sheet to a second surface of the sheet. A first aperture edge at the first surface of the sheet has a first perimeter shape having a first number of sides and a second aperture edge at the second surface of the sheet has a second perimeter having a second number of sides different from the first number of sides. The aperture has an interior reflective surface extending between the first and second aperture edges.

Another embodiment of the invention is directed to an optical system that comprises a first reflecting coupler disposed generally along a reflector axis. The reflecting coupler is formed from a sheet of material having an aperture extending therethrough from a first surface of the sheet to a second surface of the sheet. A first aperture edge at the first surface of the sheet has a first perimeter shape having a first number of sides and a second aperture edge at the second surface of the sheet has a second perimeter shape having a second number of sides different from the the first number of sides. The aperture has an interior reflective surface extending between the first and second aperture edges. A first light source is disposed proximate the first aperture edge. A first optical fiber having an entrance face is disposed proximate the second aperture edge.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
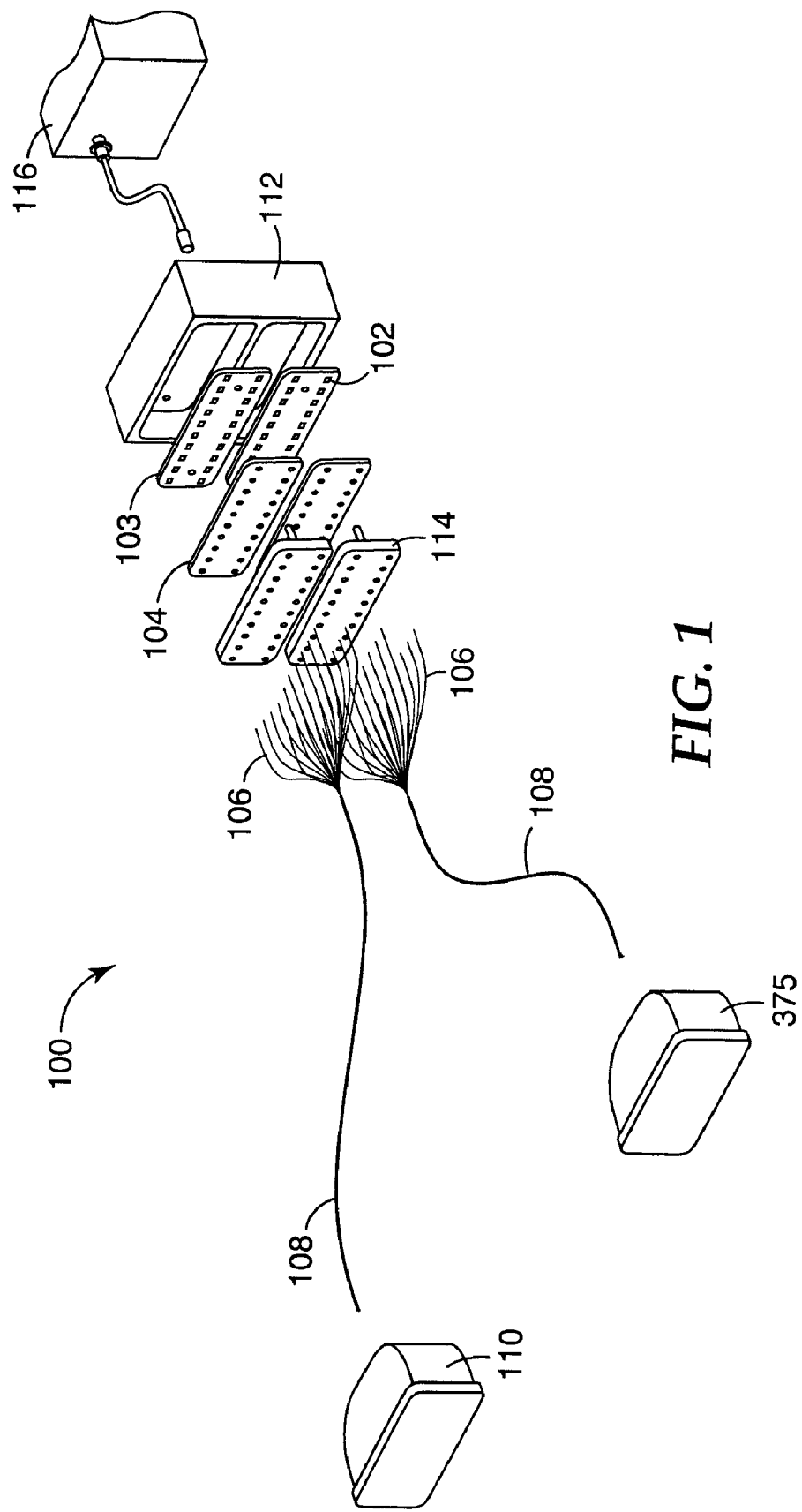
FIG. 1 presents an exploded view of an embodiment of an illumination system according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is more particularly applicable to light collection and management systems useful for illuminating a target with light from one or more light emitting diodes (LEDs).

LEDs with higher output power are becoming more readily available, which opens up new applications for LED illumination with white light. Some applications that may be addressed with high power LEDs include projection and display systems, machine vision systems and camera/video applications, and even distance illumination systems such as car headlights.

LEDs typically emit light over a wide angle, and so one of the challenges for the optical designer is the efficient collection of the light produced by an LED and the direction of the collected light to a selected target area. In some applications, the target area is the input to a light guide, such as an optical fiber, so that the light may be used for remote illumination. For example, some light sources include one or more LEDs emitting light into respective multimode optical fibers.

An example of such a light illumination system 100 is schematically illustrated in the exploded view shown in FIG. 1. The system includes a number of LEDs 102 that are optically coupled via respective reflective couplers 104 in a matching array to respective optical fibers 106. The LEDs 102 may be disposed on a substrate 103. The fibers 106 may be collected together into one or more bundles 108 that carry light to one or more illumination units 110. The fibers 106 may be multimode optical fibers. The LEDs 102, and the reflective couplers 104 may be housed in a housing 112 and the fibers 106 may be held in a spatial array close to their respective couplers 104 and LEDs 102 using a fiber mounting plate 114. The system 100 may include a power supply 116 coupled to provide electrical power to the LEDs 102.

Figure 2:
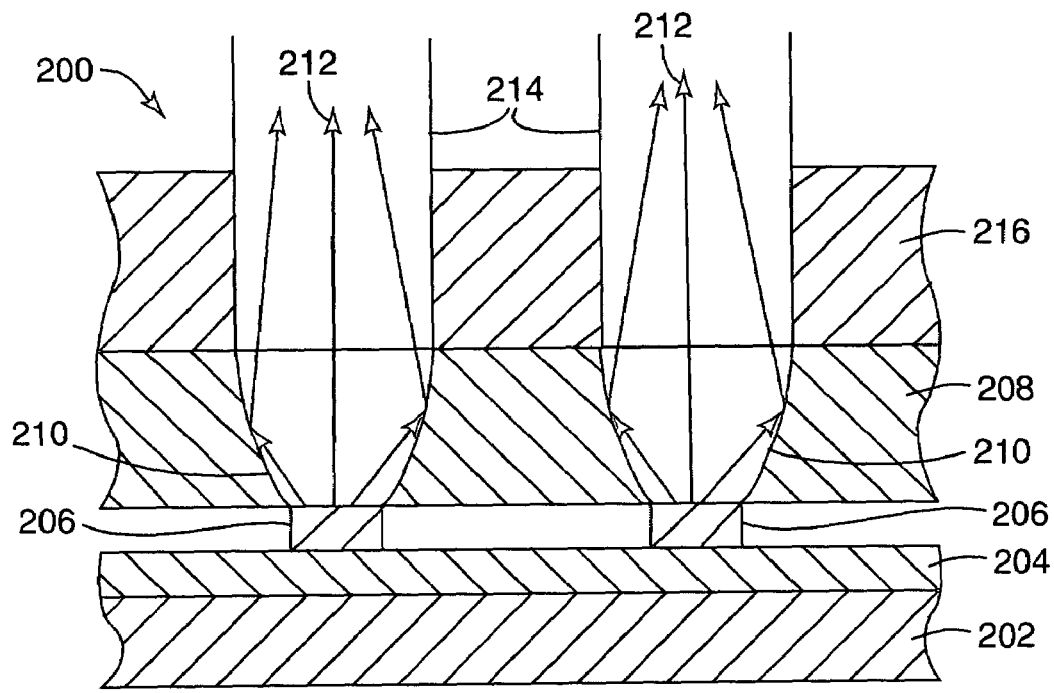
FIG. 2 schematically illustrates a cross-section through the assembled illumination system shown in FIG. 1, according to principles of the present invention.

A partial cross-section through an embodiment of an assembled light source 200 is schematically shown in FIG. 2. The light source 200 may include a base 202 that may be used as a heatsink. A thermally conductive layer 204 may be used to provide thermal coupling between an array of LEDs 206 and the base 202. A plate 208 contains an array of reflective couplers 210 that couple light 212 from the LEDs 206 to an array of respective optical fibers 214. The LEDs 206 are optically coupled to respective fibers 214 via respective reflective couplers 210. The reflective couplers 210 may be air-filled or may contain a transparent material having a higher refractive index than air, such as optical epoxy, so as to reduce the refractive index change at the interface with the semiconductor material of the LEDs 206 and thus lower reflective losses. The transparent material may partially fill the reflectors 210 or may completely fill the reflective couplers 210 from the LEDs 206 to the fibers 214. The fibers 214 may be held in position relative to the array of reflective couplers 210 by a fiber plate 216. The output ends of the fibers may be gathered and used as a light source for illumination.

The plate 208 may be molded with apertures therethrough to form the reflective couplers 210. The reflecting surfaces of the reflective couplers may be formed using different approaches, e.g. by metallization or by dielectric thin film coatings The color of at least some of the light 212 generated by the LEDS 206 may be converted to one or more different colors, so as to cover a broader range of the visible spectrum. For example, where the LEDs 206 generate blue or UV light, a phosphor may be used to generate light in other color bands in the visible region of the spectrum, for example green, yellow and/or red. The phosphor may be included on top of the LEDs 206, may be provided at the entrance to the fibers, or may be provided elsewhere. One or more wavelength selective reflectors may be used to enhance the efficiency of color conversion. The use of phosphors to convert the color of the light 212 emitted by the LEDs 206 is described further in U.S. Provisional Patent Applications, Nos. 60/443,235, 60/443,274 and 60/443,232, each of which was filed on Jan. 27, 2003; and in the following applications filed on even date herewith— "Phosphor Based Light Sources Having a Polymeric Long Pass Reflector" and "Phosphor Based Light Sources Having a Non-Planar Long Pass Reflector". All the references listed in this paragraph are incorporated herein by reference.

A reflective coupler for coupling light from an LED to a fiber might use the shape of a compound parabolic concentrator (CPC). This type of reflector was originally developed for collecting solar radiation, for example as described in Welford and Winston, "High Collection Nonimaging Optics", Academic Press, San Diego, Calif., 1989. CPCs are known for being efficient reflective concentrators that approach very close to having the maximum possible concentration ratio, i.e. the ratio of the input area to the output area.

There are several drawbacks to using CPCs as the reflective coupler in an LED-based illumination system, however. For example, CPCs are somewhat limited in their ability to efficiently couple light to a target that has a shape that is different from the shape of the source. This is a problem, because many LEDs have a square or rectangular emitting area, and optical fibers typically have a circular cross-section. CPCs are inefficient at coupling from a square source to a circular fiber target, even if the étendues of the source and target are the same. Simple physical constraints dictate that efficient coupling with a CPC requires that the étendue of the square or rectangular source be considerably smaller than that of the fiber. Another problem is that contour of a CPC may be such that the diameter of the middle section of the CPC is larger than at either end, thus making mass production of the reflectors using a molding technique difficult, if not impossible.

In addition, a high concentration ratio is not necessarily a useful figure of merit for a reflector that is to couple light from an LED to a fiber that has an aperture larger than the emitting aperture of the LED. More important is the ability to couple a large fraction of the light into a useful mode of the optical fiber. Accordingly, the utility of a CPC in coupling light from an LED to an optical fiber target is limited.

Figure 3:
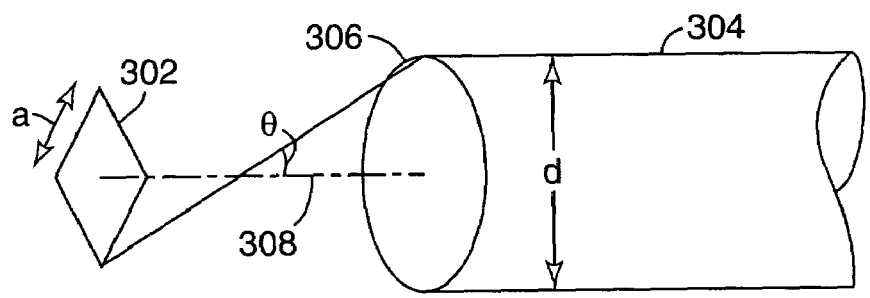
FIG. 3 schematically illustrates elements of a model for coupling light from a Lambertian light source to an optical fiber.

A Lambertian emitter is one that emits light into all angles equally. While not being exactly Lambertian, LEDs are almost Lambertian in nature, at least in the hemisphere into which light is emitted, and so it is convenient to consider Lambertian sources in the context of designing a coupler for coupling light to a fiber. One aspect of designing an optical coupler for coupling light to an optical fiber is now considered with reference to FIG. 3. A Lambertian source 302 has an emitting area in the shape of a square having a side length, a, and so the length of the diagonal of the source 302 is $a\sqrt{2}$. The fiber 304 has a circular entrance aperture 306 with diameter d. The source 302 and the entrance aperture 306 lie on the axis 308. Light that is directly incident on the entrance aperture 306 should be incident within the acceptance angle of the fiber, θ, defined by the fiber's numerical aperture (NA). In air, the NA is the sine of the acceptance angle. Under this constraint, the minimum distance, $L_{min}$, between the source and fiber is given by the expression:

$$L_{min}=(a\sqrt{2}+d)/(2 \tan \theta). \quad (1)$$

Example values for a, d and θ are a=300 µm, d=600 µm and NA (in air)=sin θ=0.48, and so, in this example, $L_{min}$ is around 936 µm. Light that is not directly incident on the entrance aperture 306 may be reflected by another surface, viz. the surface of the reflective coupler. Furthermore, to increase the amount of light efficiently coupled into the fiber, the reflective surface should be oriented in such a way as to reduce the angle of the reflected light relative to the reflector axis so that more light falls within the acceptance cone of the fiber. This means that a relatively acute angle is desirable. Thus, the shape of the reflective coupler is important for maintaining high coupling efficiency between the LED and the optical fiber. One example of reflective surface for reflectively coupling light from the LED to the optical fiber is discussed in U.S. patent application Ser. No. 10/726,222, titled "ILLUMINATION SYSTEM USING A PLURALITY OF LIGHT SOURCES", and filed on even date herewith. In that description, the profile of the reflective coupler is calculated to be close to a parabolic shape, and to be exactly described by a fourth-order expression.

Figure 4A:
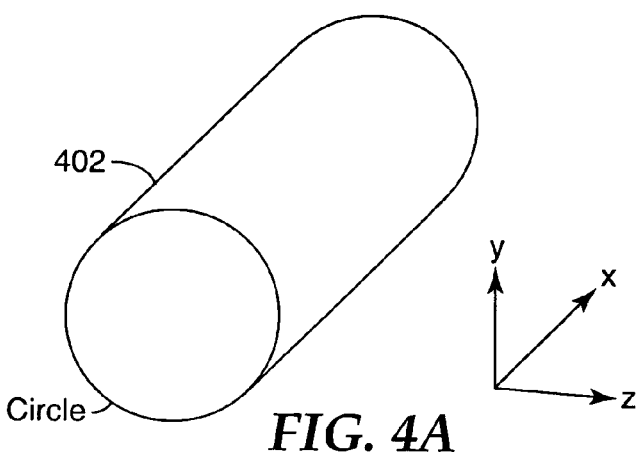
FIGS. 4A–4C schematically illustrate different two-dimensional (2-D surfaces.
Figure 4B:
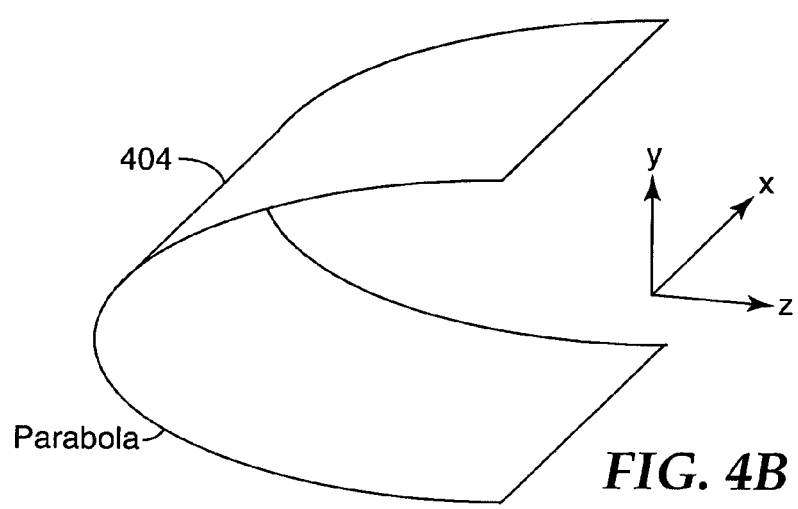
Figure 4C:
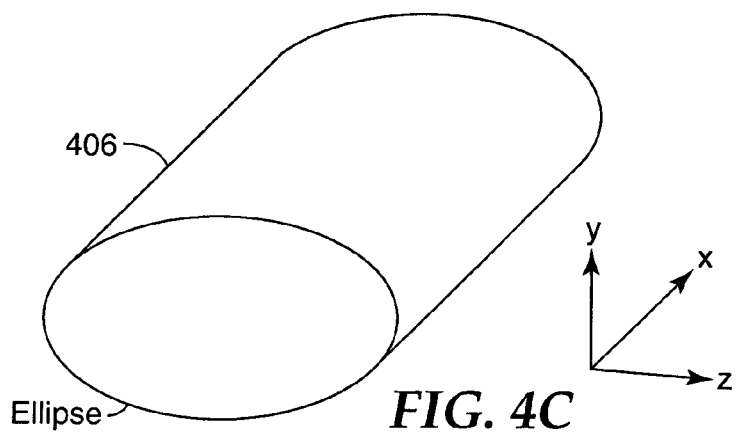

It is useful to define some terms to describe the shape of different surfaces used in the following description of the reflective coupler. The term two-dimensional surface, or 2-D surface, means that the surface has a radius of curvature in at most one plane only, e.g. the x-z plane or the y-z plane, and can be extended along one axis without changing the shape or size of a cross-section perpendicular to that axis. Examples of 2-D surfaces include flat surfaces (radius of curvature is infinite), circularly cylindrical surfaces and aspherically cylindrical surfaces. FIG. 4A shows a circularly cylindrical surface 402. Aspherically cylindrical surfaces include parabolically, elliptically and hyperbolically cylindrical surfaces. A parabolically cylindrical surface 404 is schematically illustrated in FIG. 4B and an elliptically cylindrical surface 406 is schematically illustrated in FIG. 4C. In each of the examples presented in FIGS. 4A–4C, the surfaces 402–406 are cylindrical about an axis that is parallel to the x-axis. Also, the surfaces 402–406 can be extended along the x-axis without changing the shape or size of the respective circle, parabola or ellipse.

A three-dimensional, or 3-D, surface is a surface of revolution or a surface that has a radius of curvature in more than one plane, e.g. has a radius of curvature in both the x-z plane and the y-z plane. Some examples of surfaces of revolution are cones, paraboloids, ellipsoids, and hyperboloids. Examples of surfaces that have a radius of curvature in more than one plane include spherical surfaces and toroidal surfaces. When it is indicated in the following discussion that a reflective surface conforms to a particular 2-D or 3-D surface, it is to be understood that the reflective surface need only conform to part of the particular 2-D or 3-D surface.

Figure 5A:
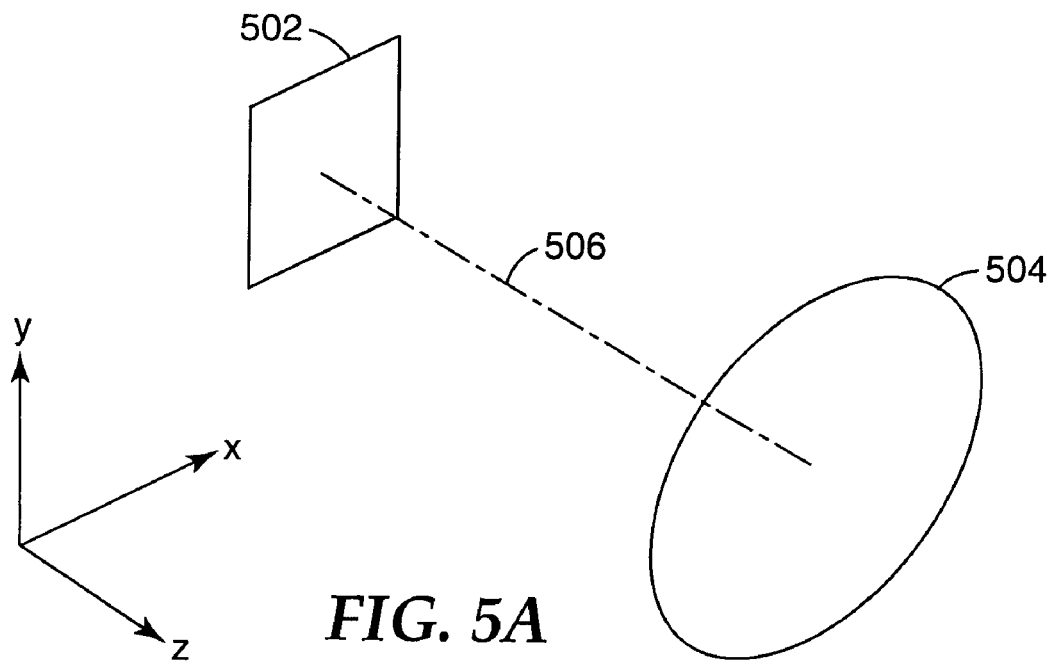
FIGS. 5A–5K schematically illustrate the construction of an embodiment of a reflective coupler that combines 2-D surfaces with a three-dimensional (3-D) surface, according to principles of the present invention.

One approach for designing a reflective coupler is now described with reference to FIGS. 5A–5K. FIG. 5A schematically illustrates the input aperture edge 502 that corresponds to a square light source, such as the emitting area of an LED. The output aperture edge 504 corresponds to the entrance aperture of an optical fiber. The aperture edges 502 and 504 form the basic shapes of the input to, and output from, the reflective coupler. The axis 506, referred to as the reflector axis, passes between the center of the input aperture edge 502 and the center of the output aperture edge 504. The reflector axis 506 is parallel to the z-axis.

The shape of the input to the reflective coupler has a different number of sides to that of the output. In the illustrated example, the perimeter shape of the input aperture edge 502 is square, and has four sides, where sides are defined as being straight line sections. The perimeter shape of the output aperture edge 504 is circular. A circle is commonly understood to have an infinite number of sides. Thus, the input aperture edge 502 defines a perimeter shape that has a number of sides that is different from the number of sides of the output aperture edge 504.

Figure 5B:
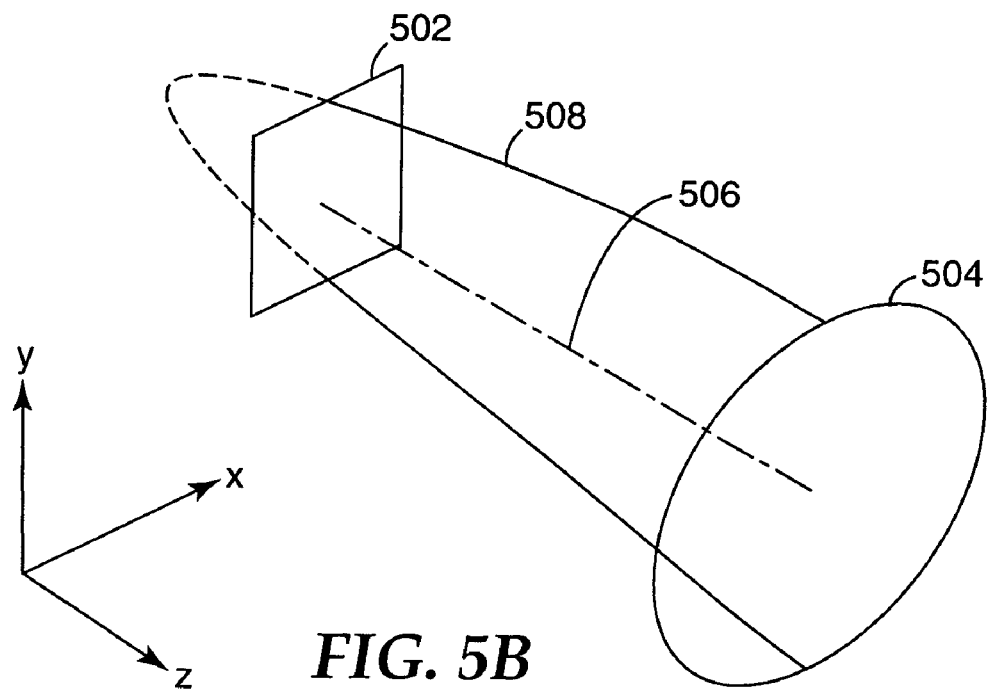
Figure 5C:
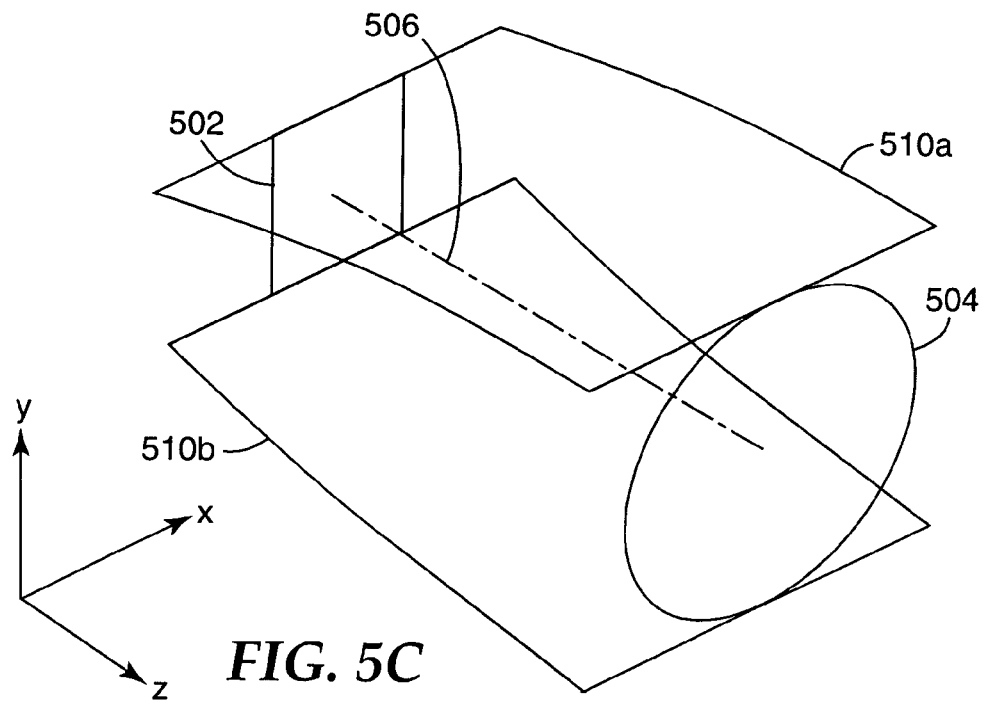

One or more 2-D surfaces are constructed relative to the input aperture edge 502, as is illustrated in FIGS. 5B and 5C. In this particular example, the 2-D surfaces conform to parabolic cylinders. A parabola 508 is drawn in the y-z plane, so as to intersect the top and bottom sides of the input aperture edge 502 and the top and bottom of the output aperture edge 504. The solid portion of the parabola 508 comprises part of the aspheric cylinder, aligned with the x-axis, as is described below with reference to FIG. 5C. The dashed portion of the parabola 508 is truncated, and is shown only to illustrate that, for this example, a single parabola is used.

FIG. 5C shows the parabola 508 of FIG. 5B after being extended in the +x and −x directions to form the parabolic cylindrical surfaces 510a and 510b. The surfaces 510a and 510b are opposed aspheric surfaces with power (curvature) in only one direction, that is the radii of curvature of the surfaces 510a and 510b lie in the y-z plane.

Figure 5D:
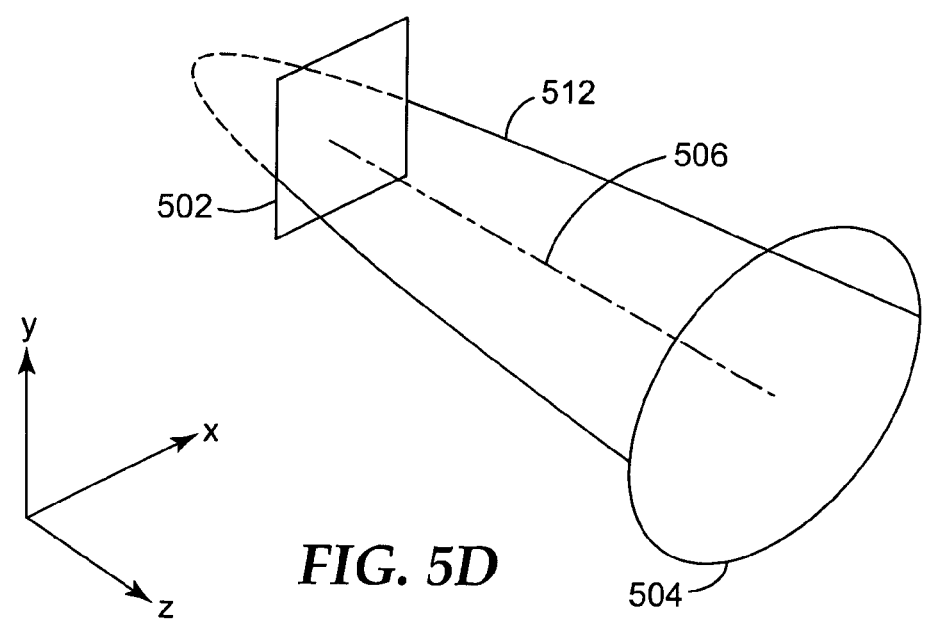
Figure 5E:
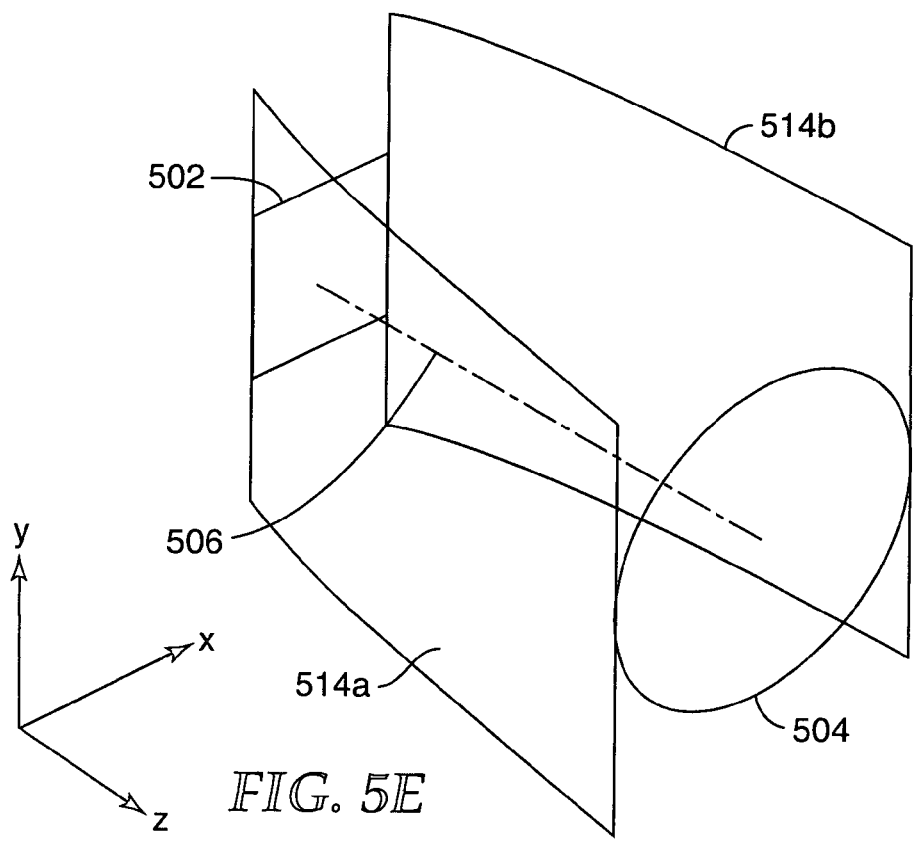

The construction of additional 2-D surfaces is now described with reference to FIGS. 5D and 5E. In FIG. 5D, a parabola 512 is drawn in the x-z plane to intersect the middle of the right and left sides of the input aperture edge 502 and the right and left of the output aperture edge 504. The solid portion of the parabola 512 corresponds to part of the aspheric cylinder that is shown in FIG. 5E, while the dashed portion of the parabola 512 is shown to illustrate that a single parabola is used. The solid portions of the parabola 512 are extended in the +y and −y directions, to form a pair of opposing aspheric surfaces 514a and 514b.

Figure 5F:
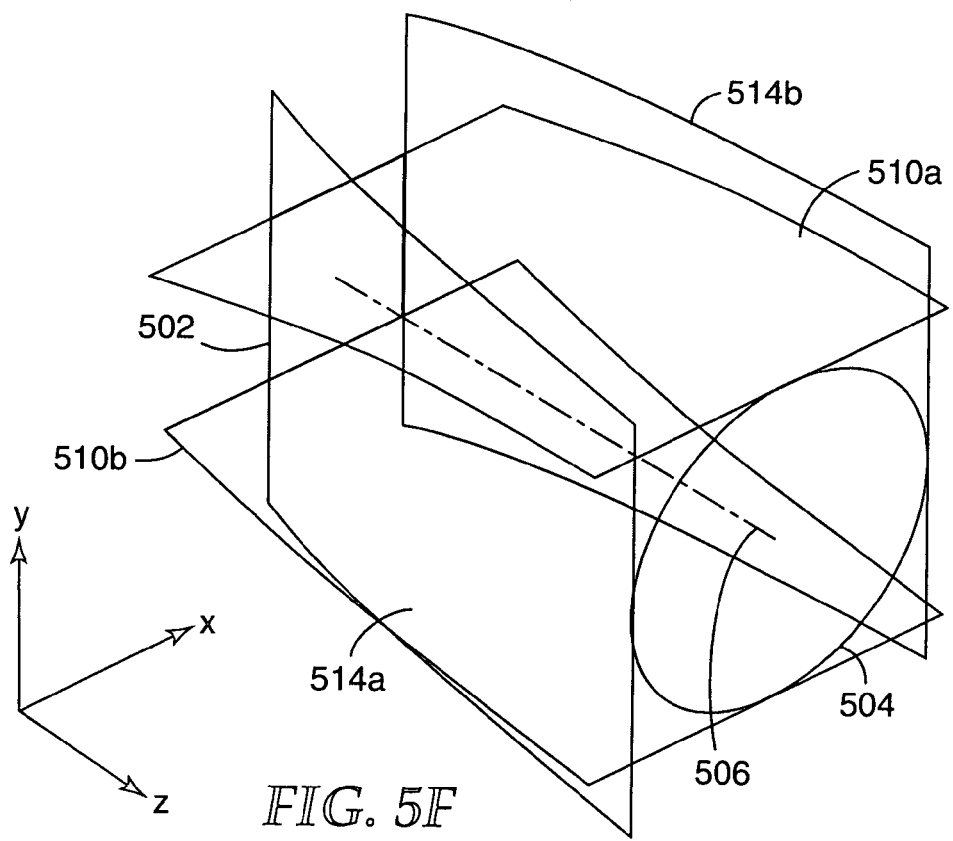
Figure 5G:
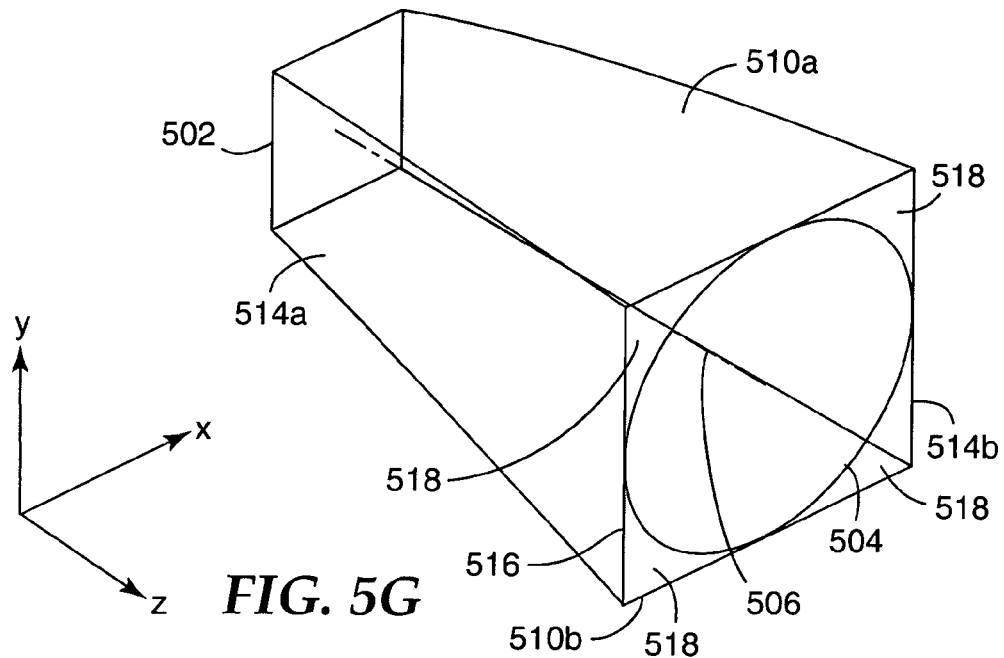
Figure 5H:
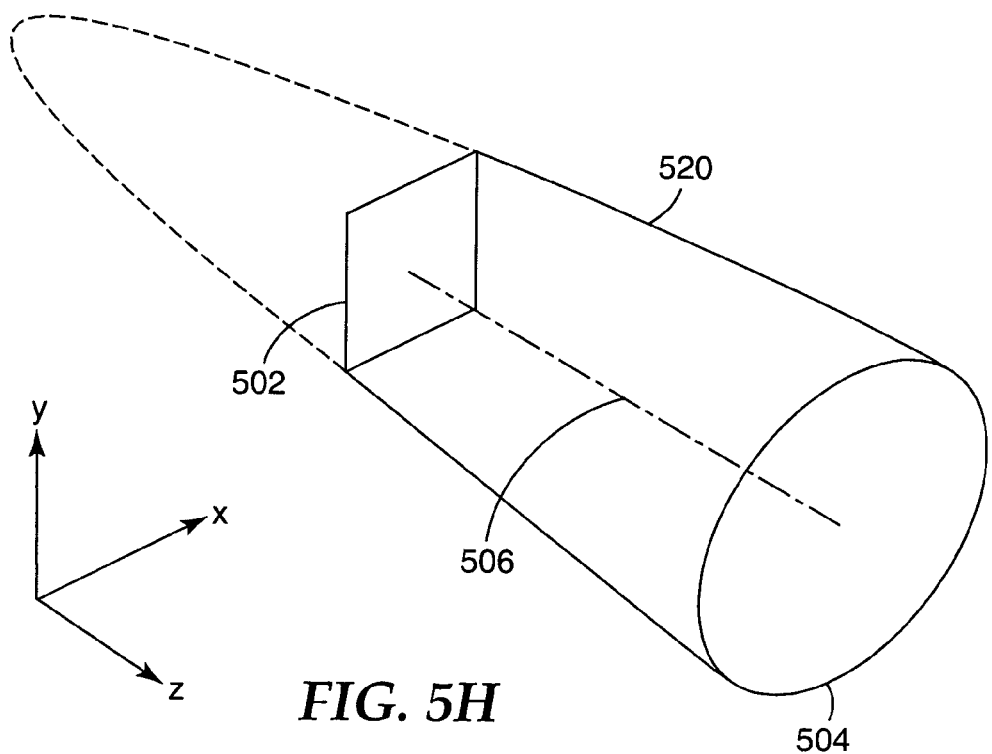
Figure 5I:
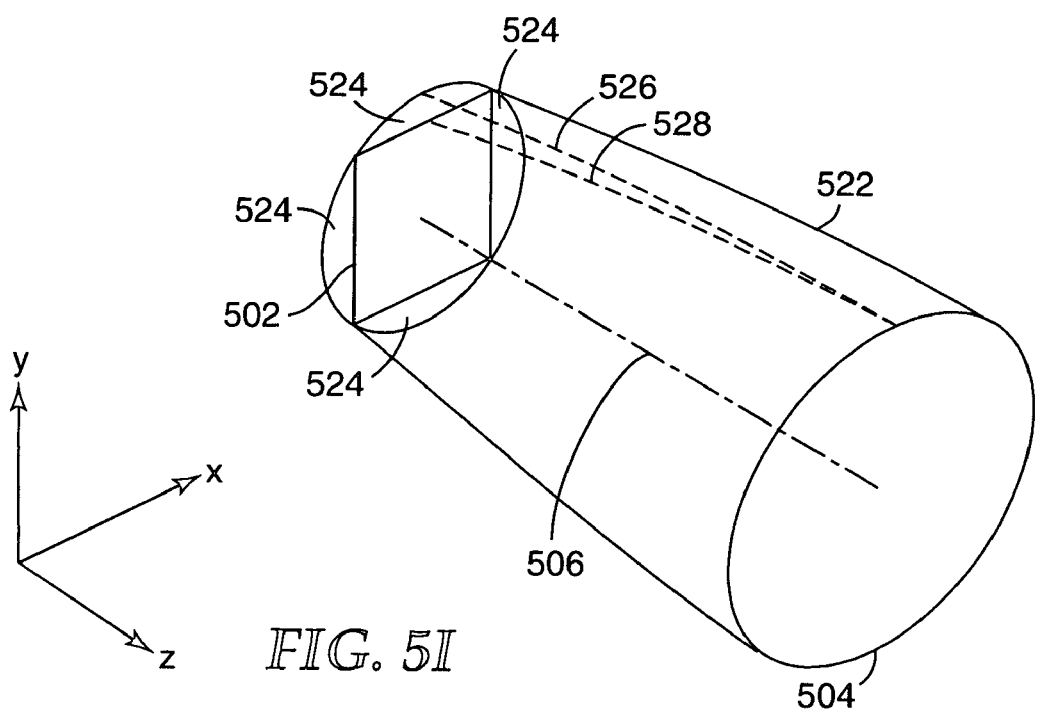

FIG. 5F schematically illustrates the 2-D surfaces 510a, 510b, 514a and 514b interleaved with each other, while FIG. 5G schematically illustrates the 2-D surfaces 510a, 510b, 514a and 514b of FIG. 5F trimmed back to their intersections. The surfaces 510a, 510b, 514a and 514b exactly fit the desired input aperture edge 502 that corresponds to the square light source. At the opposite end, however, the square output 516 does not match well to the circular output edge 504. If the reflective coupler were to be formed from the 2-D surfaces 510a, 510b, 514a and 514b alone, then a substantial amount of light would be lost in the regions 518 where the circular output edge 504 does not match the square output 516 of the 2-D surfaces 510a, 510b, 514a and 514b.

Thus, the use of only 2-D surfaces alone does not result in a reflecting surface whose input edge matches a shape having rectilinear sides while the output edge matches a shape having a circular shape.

Consider instead another surface that matches to the circular aperture of the output edge 504. This surface is a 3-D surface, in particular a surface of revolution about the reflector axis 506, as now described with reference to FIGS. 5H and 5I. In the illustrated embodiment, a parabola 520 matches to the circular output aperture edge 504, and to those portions of the input aperture edge 502 farthest away from the axis 506, namely the corners of the input aperture edge 502. Rotating the parabola about the axis 506 forms the surface of revolution 522. The surface 522 does not impinge within the area described by the input aperture edge 502.

There are disadvantages with using either the set of 2-D surfaces or the 3-D surface alone as the reflective surface for the reflective coupler to couple between the LED and the fiber. As was stated above with respect to FIG. 5G, the use of 2-D surfaces results in portions 518 that do not couple to the fiber, and so light is lost. Accordingly, the use of 2-D surfaces alone results in reduced coupling to the fiber.

Figure 6:
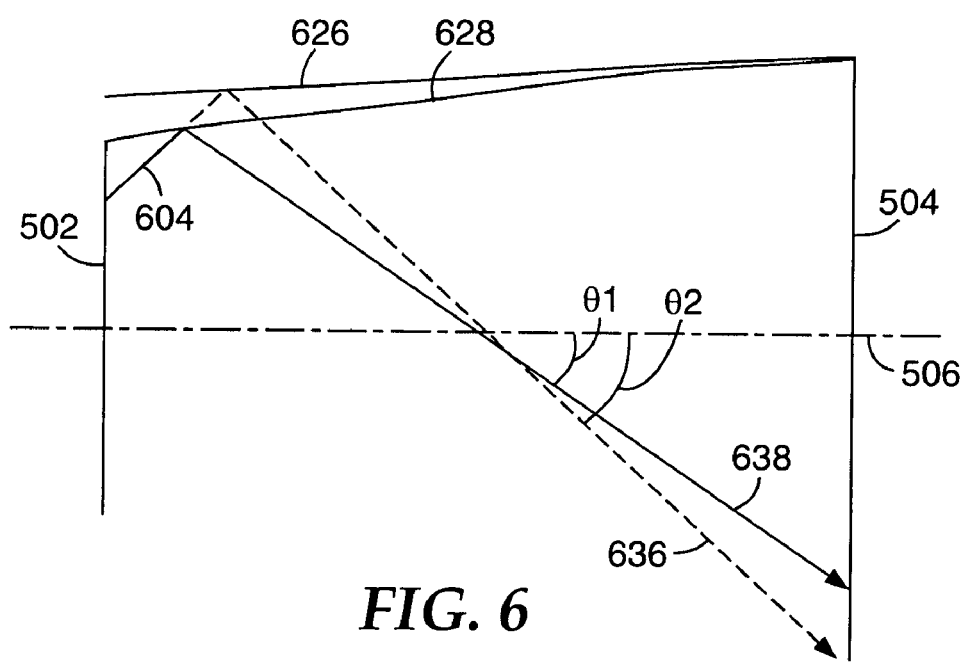
FIG. 6 schematically illustrates reflection within a reflective coupler from two different surfaces.

The use of a surface of revolution alone also results in reduced coupling of light to the fiber, for the reasons now explained with reference to FIG. 6. Consider the following comparison of the reflection of light 604 by reflecting surfaces 626 and 628. One reflecting surface 626 corresponds to line 526 on the paraboloid 522, and represents the paraboloidal reflecting surface 522. The other reflecting surface 628 corresponds to curve 528 that extends to the middle of the top edge of the square input aperture edge 502 from the output aperture edge 504. This reflecting surface corresponds to a parabolic cylindrical surface, such as surface 510a.

Light 604 is incident on each reflecting surface 626 and 628. Light reflected by surface 628 propagates as light 638, at an angle θ1 to the optical axis 506. Light reflected by surface 626 propagates as light 636, at an angle θ2 to the optical axis 506. Since the surface 628 is at a more acute angle, θ1<θ2, it is more probable that light 638 enters the fiber within the fiber's acceptance angle than does light 636. Accordingly, the more acute angle formed by reflecting surface 628 results in greater coupling into the fiber, and so the use of the 2-D surfaces, at least close to the input of the reflective coupler, increases the amount of light coupled into the fiber.

Figure 5J:
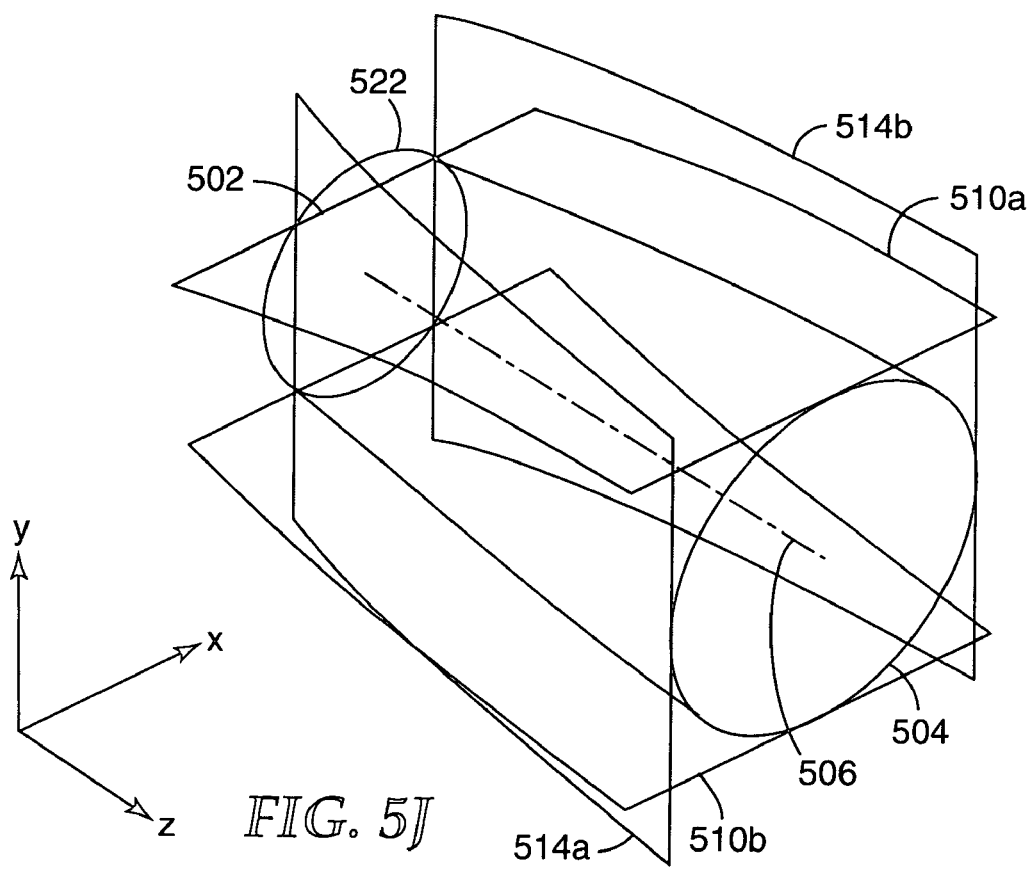
Figure 5K:
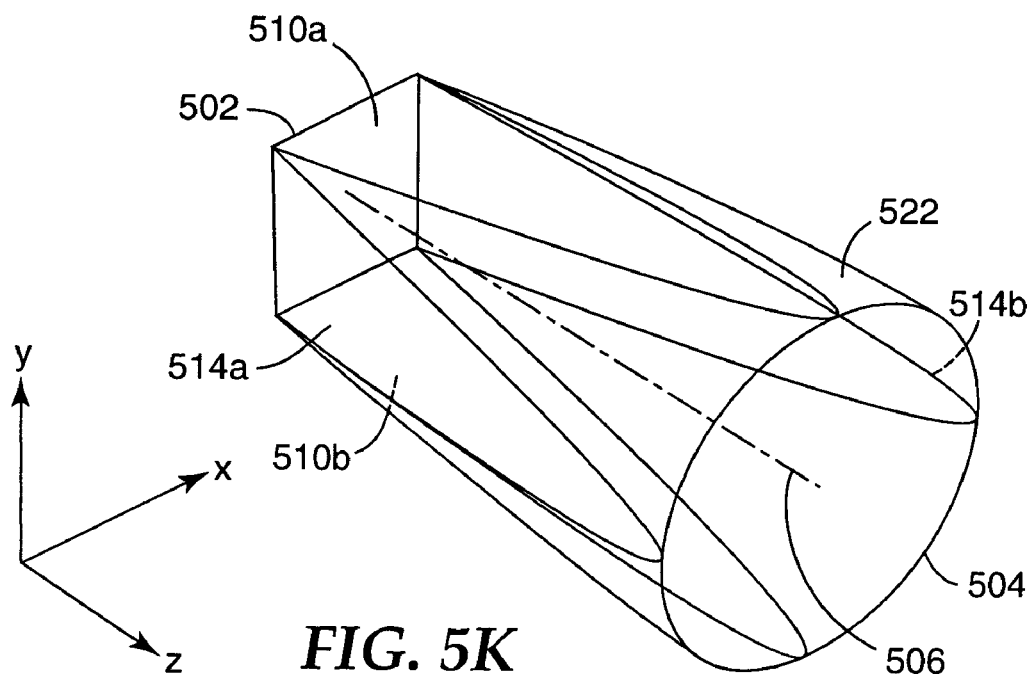

One approach to ensuring high efficiency in coupling light from the LED to the fiber is to use a reflecting surface that combines both 2-D surfaces and a 3-D surface. This is now described with reference to FIGS. 5J and 5K. FIG. 5J shows a composite with all the surfaces 510a, 510b, 514a, 514b and 522 stretching between the input aperture edge 502 and the output aperture edge 504. When light is emitted from the source at large angles relative to the optical axis 506, the light preferentially hits the 2-D surfaces, that form more acute angles relative to the surface of revolution, so that a greater proportion of the reflected light falls within the NA of the fiber. For points closer to the output of the reflective coupler, there is a transition from the 2-D surfaces to the 3D surface, which matches the shape of the fiber. FIG. 5K schematically illustrates a "trimmed" version of the reflective coupler illustrated in FIG. 5J. The trimmed version includes only those parts of the 2-D surfaces 510a, 510b, 514a and 514b that are closer to the optical axis 506 than the 3-D surface 522, and those parts of 3-D surface 522 that are closer to the optical axis 506 than the 2-D surfaces 510a, 510b, 514a and 514b.

Figure 7A:
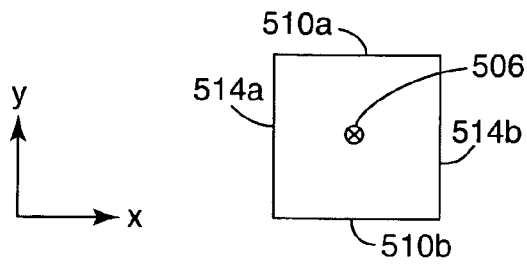
FIGS. 7A–7D schematically illustrate different cross-sections through the reflective coupler illustrated in FIG. 5K FIG. 8 schematically illustrates an LED having a complex-shaped die.
Figure 7B:
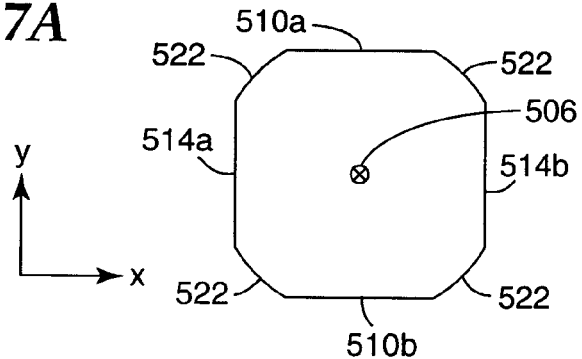
Figure 7C:
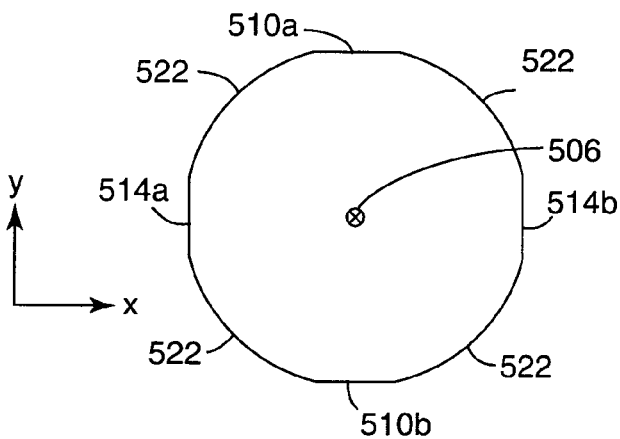

Cross-sectional views through the reflective coupler are provided in FIGS. 7A–D to aide in understanding the shape of the reflecting surface. FIGS. 7A–7C present cross-sectional views within the reflective coupler, looking along the axis 506. Thus, the planes of the sections illustrated in FIGS. 7A–7C lie parallel to the x-y plane. FIG. 7A shows a cross-section at the input aperture edge 502 of the reflective coupler. At the input aperture edge, the 2-D surfaces are all closer to the optical axis 506 than the surface of revolution 522, and so the shape of the cross-section matches the 2-D surfaces 510a, 510b, 514a and 514b. FIG. 7B shows a cross-section through the reflective coupler at a point approximately half way between the input aperture edge 502 and the output aperture edge 504. At this point, the 3-D surface 522 is closer to the axis 506 than the intersections between 2-D surfaces 510a, 510b, 514a and 514b, and so the reflective coupler conforms to the 3-D surface 522 at the "corners". The central flat portions of the 2-D surfaces 510a, 510b, 514a and 514b remain closer to the axis 506 in the +x, −x, +y and −y directions. FIG. 7C shows a cross-section through the reflective coupler close to the output aperture edge 504. The width of the flat portions 510a, 510b, 514a and 514b has reduced and the extent of the 3-D surface 522 has increased. At the output aperture edge, the cross-section of the reflective coupler comprises only the 3-D surface 522.

The 2-D surfaces 510a, 510b, 514a and 514b may be said to be "interleaved" with the 3-D surface 522, where the term "interleaved" means that, for at least one cross-section through the reflective coupler taken perpendicular to the reflector axis, at least one part of the cross-section conforms to a 2-D surface and at least another part of the cross-section conforms to a 3-D surface. The cross-sections illustrated in FIGS. 7B and 7C show interleaving, since the cross-sections show portions conforming to both the 2-D surfaces and the 3-D surface.

Figure 7D:
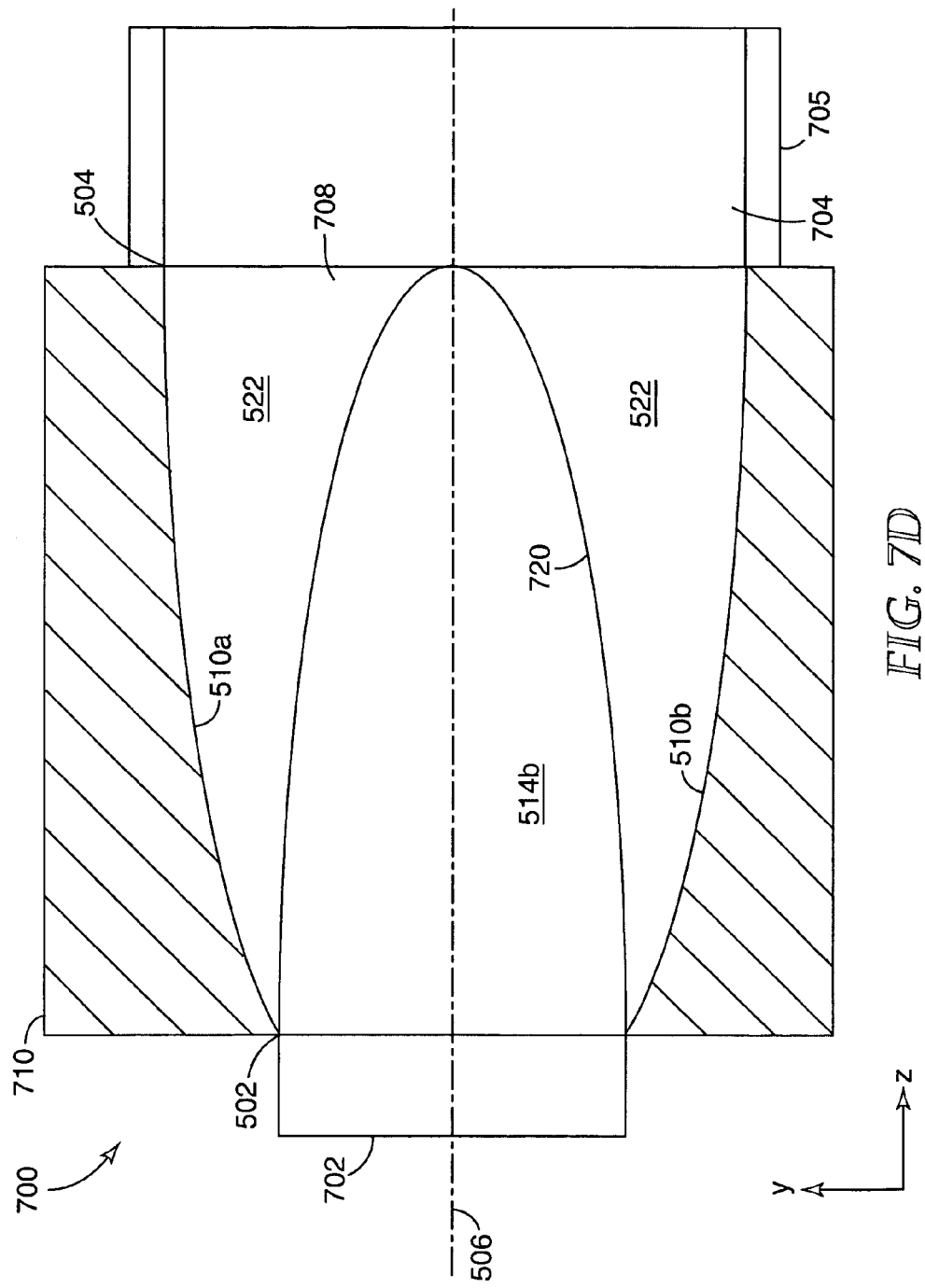

A cross-sectional view through the reflective coupler 700 in a direction perpendicular to the axis 506 is schematically presented in FIG. 7D. This view also shows that the reflective coupler 700 may be formed as an aperture 708 through a body 710, where the input aperture edge 502 is matched to an LED emitter 702 and the output aperture edge 504 is matched to an optical fiber 704. The optical fiber 704 has a cladding 705. The body 710 may have only one aperture 708 therethrough, or may extend in the x and y directions, like a sheet. The body 710 may have multiple apertures like aperture 708 extending from one side to the other side.

The reflecting surface of the reflective coupler 700 has different portions that conform to the 2-D and 3-D surfaces described above. The 2-D surfaces 510a and 510b are at the top and bottom of the reflective coupler 700 respectively and, in this view, 2-D surface 514b is seen at the back of the aperture. The line 720 denotes the demarcation between the 2-D surface 514b and the 3-D surface 522. The reflective surface becomes increasingly dominated by the 3-D surface 522 towards the output aperture edge 504.

The reflective coupler 700 has different shapes at its input and output, and is formed from a 3-D surface, such as a surface of revolution, combined with a plurality of 2-D surfaces. In the example described with respect to FIGS. 5A–5K, it was assumed that the 2-D surfaces were parabolically cylindrical surfaces and that the 3-D surface was a paraboloidal surface of revolution. The invention is not restricted to using only surfaces that conform to these shapes, and other types of surfaces may be used. For example, the 2-D surfaces may be flat, or may be circularly cylindrical, or elliptically cylindrical or may take on some other 2-D shape. Also, the 3-D surface may be conical, or ellipsoidal, or may take on some other 3-D shape.

In addition, it will be appreciated that, although the input aperture edge in the example described above was described as being square, it is not intended that the invention be limited to a square input aperture edge. Other four-sided input aperture edges may be used, for example the input aperture edge may be rectangular or adopt the shape of some other quadrilateral: the input aperture edge is set according to the desired shape for the input. For the purposes of this description, the term rectangular is intended to cover shapes that are square. The input aperture edge may also take on different shapes having linear sides. For example, the input aperture edge may be triangular, pentagonal, hexagonal, or the like. A 2-D surface may be provided to match to each of the linear-sides of the input aperture edge. For example, if the input aperture edge if triangular, then the 3-D surface may be combined with three 2-D surfaces.

A reflective coupler that has a surface conforming to a number of 2-D surfaces and also to a 3-D surface, such as a surface of revolution, is referred to herein as a 2D–3D composite reflector.

The performance of reflective couplers having different shapes was calculated. In each case, the source was assumed to be a 300 µm square Lambertian emitter placed 936 µm from the entrance face of a fiber. The diameter of the fiber core was assumed to be 600 µm, and its NA was 0.48. The interior reflective surface of the reflector was assumed to be covered with silver and Fresnel reflections were considered at the near and far edges of the fiber. Results for the calculated coupling efficiency are presented in Table I. Since the étendue of the source was greater than the étendue of the fiber, a coupling efficiency of 100% was not possible using this model.

TABLE I

Comparison of Various Reflector Geometries

| Reflector Geometry | Coupling efficiency |
|---|---|
| a) Simple cone | 51.57% |
| b) Paraboloid | 51.61% |
| c) Crossed Parabolic Cylinders | 65.66% |
| d) Simple Cone Intersecting four Flats | 75.13% |
| e) Interleaved Parabolic | 76.33% |

The first two geometries, a) the simple cone and b) the paraboloid, represented reflectors formed using 3-D surfaces only. The simple cone was a cone with circular input and exit apertures. The exit aperture matched the diameter of the fiber and the input aperture had a diameter equal to the diagonal of the light source. The paraboloidal reflector had a paraboloidal surface of revolution and had circular input and exit apertures. The exit aperture matched the diameter of the fiber and the input aperture had a diameter equal to the diagonal of the light source.

The reflector c) formed with crossed parabolic cylinders represented a reflector formed from 2-D surfaces only, for example a reflector conforming to the surfaces 510a, 510b, 514a and 514b as illustrated in FIG. 5G.

The last two geometries, d) and e) are examples of 2D–3D composite reflectors. Example d) was assumed to be formed using four flat 2-D surfaces forming a truncated pyramidal shape, interleaved with a simple cone as the 3-D surface. Example e) assumed that the 2-D surfaces were parabolic cylinders and that the surface of revolution was a paraboloid, for example as shown in FIG. 5K. As can be seen from the results of the calculations, the coupling efficiency for a 2D–3D composite reflector is significantly higher than the coupling efficiency of a simple 3-D reflector (reflectors a) and b)) and is also higher than the coupling efficiency of a compound 2-D reflector (reflector c)).

The description has so far assumed that the light source is a flat Lambertian emitter. This need not be the case, however, and the light source may have a shape that is more complex than a simple flat surface. For example, some high-powered LEDs, such as the XBright® series of silicon carbide (SiC) LEDs produced by Cree Inc., North Carolina, have a faceted shape like that schematically illustrated in FIG. 8. The LED 800 has a top surface 802 and beveled surfaces 804, all of which may emit light. A bond pad 806 may be positioned on the top surface 802 to facilitate electrical connection. Most of the light output from the LED 800 is emitted from the beveled surfaces 804, with some light also being emitted from the top surface 802. An LED axis 808 is also shown.

Figure 8:
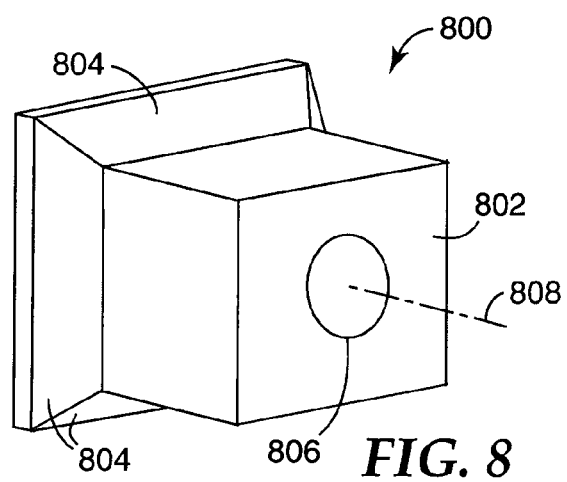

Complex LED geometries, such as that shown in FIG. 8, introduce complications in the design of a reflector for efficiency transferring the emitted light to a target having a different shape, e.g. a fiber. Beveled surfaces tend to throw more light to the side, away from the LED axis. An additional consideration is that the LED body is typically made of a semiconductor material, which has a relatively high refractive index. For example, SiC has a refractive index in the range 2.6–2.7, and gallium nitride (GaN) has a refractive index of around 2.4. These relatively high values of refractive index cause a substantial portion of the light incident on the inner surface of the LED itself to be reflected, which is subsequently scattered, absorbed or otherwise lost. This effect may be partially alleviated by encapsulating the LED in a material having a refractive index higher than air, for example within an optical epoxy having a refractive index of around 1.6. The resulting reduction in the refractive index change at the surface of the semiconductor LED die reduces the Fresnel reflective losses, thus permitting higher extraction of the light generated within the LED from the semiconductor die of the LED.

The angle of incidence at the fiber face that allows coupling into the fiber is proportionally reduced when the encapsulating material extends to the input face of the fiber. For example, if the NA of the fiber in air is 0.48, and the region between the LED and the fiber is filled with an epoxy having n=1.56, then the allowable angle of incidence at the fiber face is reduced from 28.7° to 17.9°. Thus, light that is coupled into the fiber at an angle greater than 17.9° is not guided within the fiber, and is lost in the fiber cladding. Accordingly, it is important that the reflective coupler be shaped to direct as much light into the fiber within this reduced cone angle as possible.

Figure 9:
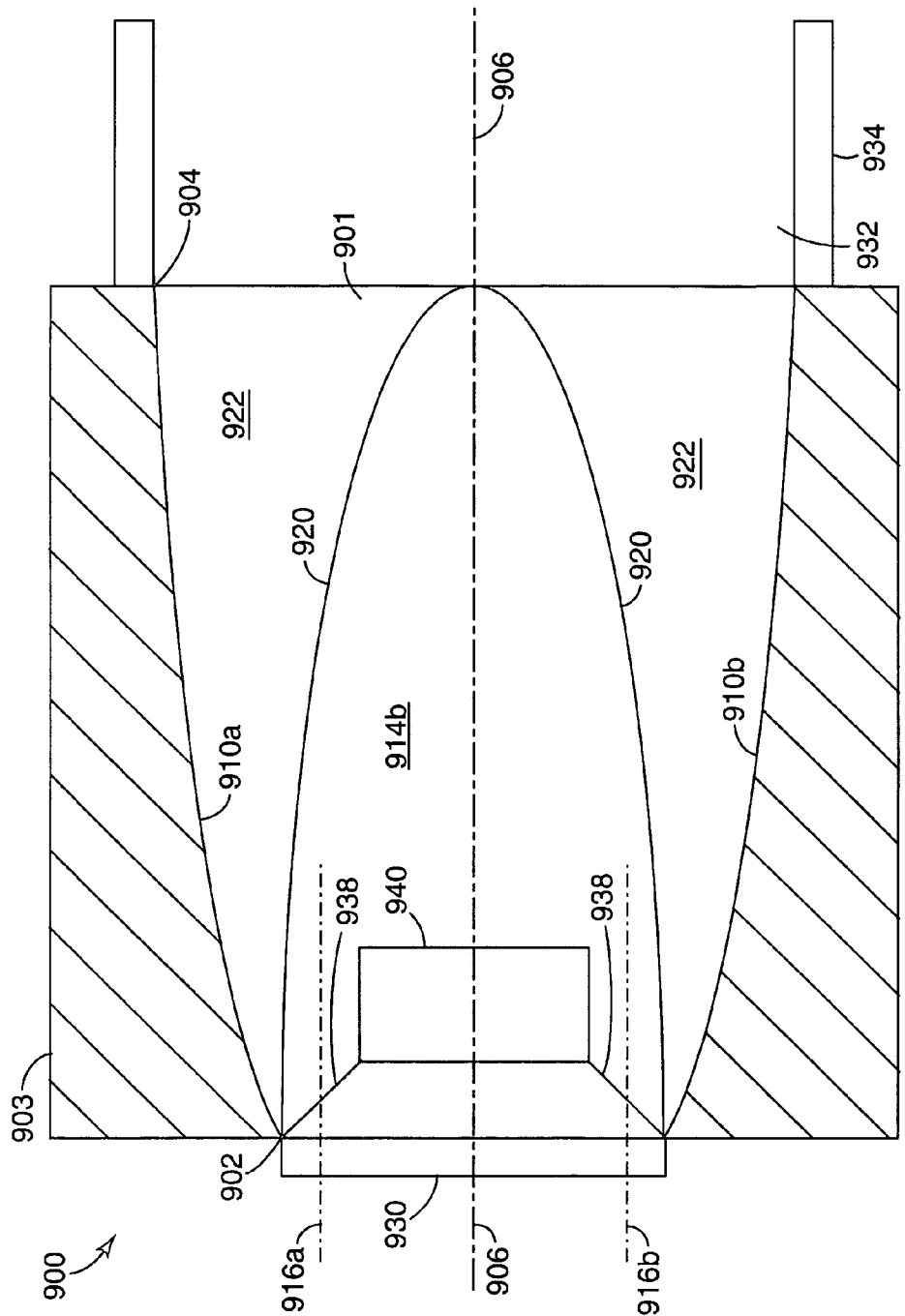
FIG. 9 schematically illustrates another embodiment of a reflective coupler that combines 2-D surfaces with a 3-D surface, according to principles of the present invention.

In the example of a 2D–3D composite reflector discussed above, opposing 2-D surfaces, such as surfaces 510a and 510b shown in FIG. 5K, conformed to a parabolic cylinder whose axis was coincident with the reflector axis 506. This need not be the case, and the axis of the parabolic cylinder may be non-coincident with the reflector axis, and need not even be parallel to the reflector axis. In addition, the opposing 2-D surfaces may conform to surfaces having different axes. For example, surface 510a may be formed with respect to a first axis and surface 510b formed with respect to a second axis. This is shown in FIG. 9, which schematically illustrates a reflective coupler 900 for coupling light from an LED 930 having a shape like the LED in FIG. 8 to the core 932 of optical fiber. The fiber core 932 may be surrounded by a cladding 934.

The reflective coupler 900 may be formed as an aperture 901 through a body 903. The aperture 901 has a reflecting wall that conforms to a number of 2-D surfaces, including surfaces 910a, 910b and 914b and to a surface of revolution 922. Surfaces 910a and 910b extend into and out of the plane of the figure in the same manner as surfaces 510a and 510b in FIG. 7. Lines 920 denote the demarcation between the 2-D surface 914b and the 3-D surface 922. The 2-D surfaces, including surfaces 910a, 910b and 914b, form an entrance aperture edge 902 that closely fits the form of the LED 930. In this particular embodiment, the 2-D surfaces each conform to a parabolic reflecting surface formed about a respective 2-D surface axis that is offset from the reflector axis 906. For example, the 2-D surface 910a conforms to a parabolic 2-D surface formed around the 2-D surface axis 916a. Likewise, the 2-D surface 910b conforms to a 2-D surface formed around the 2-D surface axis 916b. It will be appreciated that 2-D surface 914b and any other 2-D surface present may also be formed around respective 2-D surface axes (not shown).

The 2-D surface axes 916a and 916b need not be coincident with the reflector axis 906, and may be displaced relative to the reflector axis 906. The 2-D surface axes 916a and 916b may be parallel to the reflector axis 906, but may also be non-parallel to the reflector axis 906. The 2-D surface axes 916a and 916b may be positioned, for example, so as to pass through the center of the beveled surfaces 938 of the LED 930. Such an arrangement may be particularly useful where the beveled surfaces 938 emit a significant fraction of the light output from the LED 930. Furthermore, where the 2-D surface has a focus, the focus may be placed close to, or at, the center of the beveled surfaces 938. Examples of 2-D surfaces that have foci include parabolic surfaces and elliptical surfaces. Placement of the focus close to the center of the surface that emits most light advantageously directs an increased fraction of the emitted light to the fiber core 932, in a direction approximately parallel to the reflector axis 906.

For light that is emitted from the beveled facet 938 in a direction that is not directly incident on the end of the fiber core 932, the 2-D reflectors 910a, 910b, and any other 2-D surfaces reflect and partially collimate the light towards the fiber core 932 so that an increased portion of the emitted light enters the fiber core 932 within the fiber's NA. Light is also emitted from the flat end 940 of the LED 930. Some of this light is directly incident on the input to the fiber 932 and some is incident on the fiber input after reflecting off the reflector 900.

The coupling efficiency of light from an LED having a die shaped as illustrated in FIG. 8 was compared for reflective couplers having different geometries. In particular, the coupling efficiency of a tapered conical reflector, conforming to two conical reflectors joined end to end along the axis of the reflective coupler, was compared to that of a 2D–3D composite reflector like that shown in FIG. 9, having offset 2-D parabolic surfaces and a paraboloidal 3-D surface. In each case, the reflective coupler was assumed to be filled with an epoxy (n~1.56) and index matched to the fiber. The amount of light coupled from the LED to the fiber using the tapered conical reflective coupler was normalized to 1. In comparison, the normalized amount of light coupled into the fiber using the 2D–3D composite reflector 900, was calculated to be about 1.7. In other words, the 2D–3D composite reflective coupler 900 was 70% more efficient at coupling light to the fiber than the tapered conical reflector.

The present invention should not be considered to be limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical system, comprising:
    a first reflecting coupler disposed generally along a reflector axis, and formed from a body having an aperture extending therethrough from a first side to a second side, an interior surface of the aperture being reflective, at least a first portion of the interior reflective surface conforming to a two-dimensional (2-D) surface and at least a second portion of the interior reflective surface conforming to a three-dimensional (3-D) surface, the 2-D surface extending at least partially between the first and second sides of the body;
    a first light source disposed proximate the first side of the body so as to emit light into the aperture; and
    a first optical fiber having an entrance face disposed proximate the second side of the body so as to receive light through the aperture from the first light source.

2. A system as recited in claim 1, wherein the light source is a light emitting diode.

3. A system as recited in claim 1, further comprising a plurality of light sources directing light into a plurality of respective optical fibers via a plurality of respective reflecting couplers, the plurality of light sources comprising the first light source, the plurality of optical fibers comprising the first optical fiber and the plurality of reflecting couplers comprising the first reflecting coupler.

4. A system as recited in claim 3, wherein the light sources are arranged in an array, and the reflecting couplers and optical fibers are disposed in respective arrays to match the light source array.

5. A system as recited in claim 3, wherein the reflecting couplers are formed in a sheet of material, the material of the sheet comprising the body.

6. A system as recited in claim 3, wherein the fibers of the plurality of fibers are bundled together and have outputs at an illumination unit.

7. A system as recited in claim 3, further comprising a power source coupled to supply power to the plurality of light sources.

8. A reflecting coupler, comprising:
    a sheet of material having an aperture extending therethrough from a first surface of the sheet to a second surface of the sheet, a first aperture edge at the first surface of the sheet defining a first perimeter shape having a first number of sides and a second aperture edge at the second surface of the sheet defining a second perimeter shape having a second number of sides, the first number of sides being different from the second number of sides, the aperture having an interior reflective surface extending between the first and second aperture edges, wherein a first portion of the interior reflective surface conforms to a 2-D surface and a second portion of the interior reflective surface conforms to a 3-D surface.

9. A coupler as recited in claim 8, wherein the first perimeter shape is rectangular and the second perimeter shape is circular.

10. A coupler as recited in claim 8, wherein the first perimeter shape comprises linear sides and the interior reflecting surface proximate the first aperture edge conforms to 2-D surfaces, each 2-D surface terminating at a respective linear side of the first perimeter edge.

11. A coupler as recited in claim 10, wherein the 2-D surfaces comprise at least a pair of opposing 2-D surfaces that conform to an aspheric cylinder.

12. A coupler as recited in claim 11, wherein the aspheric cylinder is a parabolic cylinder.

13. A coupler as recited in claim 8, wherein a reflector axis is defined between the first and second surfaces of the sheet, along the center of the aperture, and at least one of the 2-D surfaces is formed with respect to a 2-D surface axis.

14. A coupler as recited in claim 13, wherein the 2-D surface axis is coincident with the reflector axis.

15. A coupler as recited in claim 13, wherein the 2-D surface axis is non-coincident with the reflector axis.

16. A coupler as recited in claim 8, wherein the second perimeter shape is circular and the interior reflecting surface proximate the second aperture edge conforms substantially a surface of revolution.

17. A coupler as recited in claim 16, wherein the surface of revolution is a paraboloid.

18. A coupler as recited in claim 8, wherein the 2-D surface and 3-D surface are interleaved.

19. An optical system, comprising:
a first reflecting coupler disposed generally along a reflector axis, and formed from a sheet of material having an aperture extending therethrough from a first surface of the sheet to a second surface of the sheet, a first aperture edge at the first side of the sheet defining a first perimeter shape having a first number of sides and a second aperture edge at the second side of the sheet defining a second perimeter shape having a second number of sides, the first number of sides being different from the second number of sides, the aperture having an interior reflective surface extending between the first and second aperture edges;
a first light source disposed proximate the first aperture edge; and
a first optical fiber having an entrance face disposed proximate the second aperture edge.

20. A system as recited in claim 19, wherein the light source is a light emitting diode.

21. A system as recited in claim 19, further comprising a plurality of light sources directing light into a plurality of respective optical fibers via a plurality of respective reflecting couplers, the plurality of light sources comprising the first light source, the plurality of optical fibers comprising the first optical fiber and the plurality of reflecting couplers comprising the first reflecting coupler.

22. A system as recited in claim 21, wherein the light sources are arranged in an array, and the reflecting couplers and optical fibers are disposed in respective arrays to match the light source array.

23. A system as recited in claim 21, wherein the fibers of the plurality of fibers are bundled together and have outputs at an illumination unit.

24. A system as recited in claim 21, further comprising a power source coupled to supply power to the plurality of light sources.

25. A reflecting coupler comprising a body having an aperture extending therethrough from a first side to a second side, wherein an interior surface of the aperture is reflective, wherein a first portion of the interior reflective surface conforms to a two-dimensional (2-D) surface and a second portion of the interior reflective surface conforms to a three-dimensional (3-D) surface, wherein the 2-D surface is an aspheric cylinder, wherein the 2-D surface extends at least partially between the first and second sides of the body, and further wherein the first portion is disposed proximate the first side of the body and the second portion is disposed proximate the second side of the body.

26. A coupler as recited in claim 25, wherein the reflective surface proximate the first aperture edge conforms substantially to two intersecting aspheric cylinders.

27. A coupler as recited in claim 26, wherein a reflector axis is defined longitudinally along the center of the aperture between the first and second sides, and the aspheric cylinders are formed about the reflector axis.

28. A coupler as recited in claim 26, wherein the aspheric cylinders are parabolic cylinders.

29. A reflecting coupler comprising a body having an aperture extending therethrough from a first side to a second side, wherein an interior surface of the aperture is reflective, wherein a first portion of the interior reflective surface conforms to a two-dimensional (2-D) surface and a second portion of the interior reflective surface conforms to a three-dimensional (3-D) surface, wherein the 2-D surface extends at least partially between the first and second sides of the body, wherein the first portion is disposed proximate the first side of the body and the second portion is disposed proximate the second side of the body, and further wherein the reflective surface conforms substantially to four aspherically cylindrical surfaces proximate the first side and a surface of revolution proximate the second side.

30. A coupler as recited in claim 12, wherein the 2-D surface and the 3-D surface are interleaved.

31. An optical system, comprising:
a reflecting coupler comprising a body having an aperture extending therethrough from a first side to a second side, wherein a reflector axis is defined longitudinally along the center of the aperture between the first and second sides, wherein an interior surface of the aperture is reflective, wherein a first portion of the interior reflective surface conforms to a two-dimensional (2-D) surface formed with respect to a 2-D surface axis that is non-coincident with the reflector axis, wherein a second portion of the interior reflective surface conforms to a three-dimensional (3-D) surface, wherein the 2-D surface extends at least partially between the first and second sides of the body, and further wherein the first portion is disposed proximate the first side of the body and the second portion is disposed proximate the second side of the body; and
a light emitting diode LED disposed at the first side of the body to emit light into the aperture, the LED having a first emitting surface non-perpendicular to the reflector axis, the 2-D surface axis passing through the first emitting surface.

32. A system as recited in claim 31, wherein the 2-D surface defines a focus on the 2-D surface axis, the focus being positioned on the first emitting surface.

* * * * *

UNITED STATES PATENT AND TRADEMARK OFFICE
CERTIFICATE OF CORRECTION

PATENT NO. : 7,403,680 B2
APPLICATION NO. : 10/726244
DATED : July 22, 2008
INVENTOR(S) : John J. Simbal It is certified that error appears in the above-identified patent and that said Letters Patent is hereby corrected as shown below:

Column 1
Line 8, Delete "10/726,222;" and insert -- 10/726,222 Attorney Docket No. 58130US004; --, therefor.
Line 10, Delete "10/726,248;" and insert -- 10/726,248 Attorney Docket No. 59376US002; --, therefor.
Line 11, Delete "10/726,225;" and insert -- 10/726,225 Attorney Docket No. 59349US002; --, therefor.
Line 12, Delete "10/727,220;" and insert -- 10/727,220 Attorney Docket No. 59333US002; --, therefor.
Line 14, Delete "10/726,997;" and insert -- 10/726,997 Attorney Docket No. 58389US004; --, therefor.
Line 16, Delete "10/727,072." and insert -- 10/727,072 Attorney Docket No. 59416US002. --, therefor.

Column 2
Line 50, After "from the" delete "the".(Second Occurrence).

Column 3
Line 6, After "invention" delete "." and insert -- ; --, therefor.
Line 11, After "D" insert -- ) --.
Line 19, After "5K" insert -- . --.

Column 4
Line 27, After "coatings" insert -- . --.
Line 44, After "Reflector"" insert -- having attorney docket no. 58389US004 --.
Line 45, After "Reflector"" insert -- attorney docket no. 59416US002 --.

UNITED STATES PATENT AND TRADEMARK OFFICE
CERTIFICATE OF CORRECTION

PATENT NO. : 7,403,680 B2 Page 2 of 2
APPLICATION NO. : 10/726244
DATED : July 22, 2008
INVENTOR(S) : John J. Simbal It is certified that error appears in the above-identified patent and that said Letters Patent is hereby corrected as shown below:

Column 5
Line 48, Before "and" insert -- having Attorney Docket No. 5813US004 --.

Column 10
Line 9, Delete "))" and insert -- ) ( --, therefor.

Column 14
Line 34, In Claim 30, delete "12," an insert -- 29, --, therefor.

Signed and Sealed this

Fourteenth Day of October, 2008

JON W. DUDAS
*Director of the United States Patent and Trademark Office*